US006269831B1

(12) United States Patent

Blair, Jr. et al.

(10) Patent No.: US 6,269,831 B1

(45) Date of Patent: Aug. 7, 2001

(54) PRECISION VOLUMETRIC MEASURING AND MIXING APPARATUS

(75) Inventors: Howard Blair, Jr., Columbia; John Michael Dickert, Chapin; Clarence Bernard Mahoney, Jr., Camden, all of SC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/052,189

(22) Filed: Mar. 31, 1998

(51) Int. Cl.[7] .................................................... G05D 11/13

(52) U.S. Cl. .................... 137/101.25; 137/396; 137/558; 137/599.04; 137/599.05

(58) Field of Search .............................. 137/101.25, 599, 137/606, 558, 396, 559.04, 559.05

(56) References Cited

U.S. PATENT DOCUMENTS

| | | | |
|---|---|---|---|
| 3,705,598 | * 12/1972 | Ray | 137/101.25 |
| 3,963,146 | * 6/1976 | Esbjornsson | 137/599.05 X |
| 4,362,033 | 12/1982 | Young | 68/207 |
| 4,374,785 | * 2/1983 | Wyatt | 137/599.05 |
| 4,633,413 | 12/1986 | Caveney et al. | 364/500 |
| 4,650,339 | 3/1987 | Chetcuti et al. | 366/142 |
| 5,203,504 | 4/1993 | Frost et al. | 239/10 |
| 5,207,251 | * 5/1993 | Cooks | 137/396 X |
| 5,288,145 | 2/1994 | Mackey et al. | 366/152 |
| 5,329,965 | * 7/1994 | Gordon | 137/599 |
| 5,339,854 | * 8/1994 | Leith | 137/101.25 X |
| 5,346,302 | 9/1994 | Ryu | 366/101 |
| 5,558,435 | 9/1996 | Marjo | 366/144 |

FOREIGN PATENT DOCUMENTS

| | | | |
|---|---|---|---|
| 42 01 811 A1 | 1/1992 | (DE) | B67D/5/08 |
| 0 589 053 A1 | 4/1992 | (EP) | B65G/53/66 |
| 1124502 | 9/1965 | (GB) | G05D/7/04 |
| Toku Kai Hei 5-64733 | 3/1993 | (JP) | B01F/3/08 |
| Toku Kai Hei 5-64734 | 3/1993 | (JP) | B01F/3/08 |
| WO98/31862 | 7/1998 | (WO) | D06B/23/20 |

* cited by examiner

*Primary Examiner*—Stephen M. Hepperle

(57) ABSTRACT

An apparatus for mixing a first liquid with at least a second liquid includes a tank having a mixing chamber to which is connected a first and a second supply line from each of a first and a second source of liquid. A gross control valve disposed in each of the first supply lines and a fine control valve disposed in each of the second supply lines. A noncontacting detector measures the total volume of liquid present in the mixing chamber. A controller, operable in response to signals output from the detector representative of the total volume within the mixing chamber as continuously measured by the detector, actuates in accordance with a predetermined sequence the gross and the fine control valves in the respective first and second supply lines from the first source and from the second source in accordance with a predetermined sequence.

9 Claims, 1 Drawing Sheet

PRECISION VOLUMETRIC MEASURING AND MIXING APPARATUS

BACKGROUND OF THE INVENTION

1. Field of the Invention

This invention relates to a precision apparatus for measuring and mixing volumes of two or more liquids.

2. Description of the Prior Art

In the manufacture of synthetic thermoplastic fiber materials, such as polyamides, polyesters, or polyolefins, it is common practice to apply a finish liquid (also known as a "spin finish") to the surface of the fibers. The spin finish may be applied using any of a variety of mechanical expedients, such as a metered tip applicator, a rotary kiss roller, or a metered spray applicator.

The finish liquid is commonly formulated in an area remote from the area housing the fiber spinning machines. The finish liquid is formulated by measuring and them mixing a predetermined volume of each of several finish components in a preferred order, the last of these being a diluent liquid. For economy, one relatively large volume mixing tank is typically dedicated to the finish preparation for a plurality of spinning machines. This arrangement has certain disadvantages.

Storing a large volume of liquid material in a single mixing tank enhances the possibility of bacteria growth. In addition, since a single mixing tank is used to service a multiple number of spinning machines, each machine would receive a "standard" finish mixture as prepared in that tank. When, as occurs from time-to-time, changes are made to a given finish formulation, unused quantities of previously formulated finish mixtures may result. Moreover, if a mixture different from the standard would be preferable for a fiber being produced by a given spinning machine, a separate mixing tank would be dedicated solely to that different mixture. Owing to the size and space occupied by the mixing tanks it is believed to be economically impractical to allocate a finish mixing tank to a spinning machine on a one-to-one basis.

There have been attempts in the art to overcome these problems using a so-called "just-in-time" smaller-volume batch diluter apparatus that is located near a the spinning machine. Typical devices use spring-loaded flow regulators, such as the Kates Flow Regulator, manufactured by W. A. Kates Company, Ferndale, Mich. These spring-loaded devices are economical, but are subject to loss of accuracy should the supply pressures drop below a critical minimum, or if the supply stream viscosity changes so as to significantly affect the pressure drop through the device. A more elaborate and costly device, such as the Henkel In-line Mixer, manufactured by Henkel Corporation, Charlotte, N.C., uses another flow sensing and flow control valve scheme to reduce the sensitivity to supply pressure or viscosity changes.

In any case, devices which rely on flow measurement and control are subject to inaccuracies during start-up where flow phenomena, such as pressure transients and flow acceleration, create a non-steady-state condition. This disadvantage can be overcome by either diverting the start-up flow to waste, or by blending it with large quantities of accurately diluted finish. By using large volume tanks so that these diluter apparatus have longer steady-state run times, the inaccurately measured volumes of liquids during start-up transient periods are small in proportion to the more accurate volumes measured during steady-state running periods.

Assuming good mixing in a sufficiently large tank, the average composition of the finish can be maintained within acceptable limits.

In view of the foregoing it is believed to be advantageous to provide a volumetric mixing apparatus adapted to prepare in a precision manner a finish liquid mixture particularized for an associated spinning machine.

SUMMARY OF THE INVENTION

The present invention is directed to an apparatus for mixing a first liquid, such as a concentrated spin finish liquid material, with at least a second liquid, such as a diluent. The apparatus comprises a tank having a mixing chamber therein. Each of a first and a second liquid source is connected to the mixing chamber through a first and a second supply line. A gross control valve is disposed in each of the first supply lines and a fine control valve is disposed in each of the second supply lines. An outlet conduit having a drain valve therein emanates from the mixing chamber. A liquid level detector, such as an ultrasonic liquid level detector of the noncontacting type, measures the total volume of liquid present in the mixing chamber. A controller, operable in response to signals output from the detector representative of the total volume within the mixing chamber, actuates the gross and the fine control valves in the respective first and second supply lines from each source in accordance with a predetermined sequence. The controller also actuates the drain valve in the outlet conduit when the volume of liquid in the mixing chamber as measured by the detector equals a predetermined liquid volume.

Following the termination of the actuation sequence for the gross and fine control in the respective first and second supply lines, the controller may (prior to actuation of the drain valve) operate to monitor for a predetermined time delay period the volume of liquid in the mixing chamber as measured by the detector and to generate an alarm signal if the measured volume of the liquid deviates from a predetermined reference liquid volume.

BRIEF DESCRIPTION OF THE DRAWINGS

The invention will be more fully understood from the following detailed description, taken in connection with the accompanying drawing, which forms a part of this application, and in which.

DETAILED DESCRIPTION OF THE INVENTION

Figure 1:
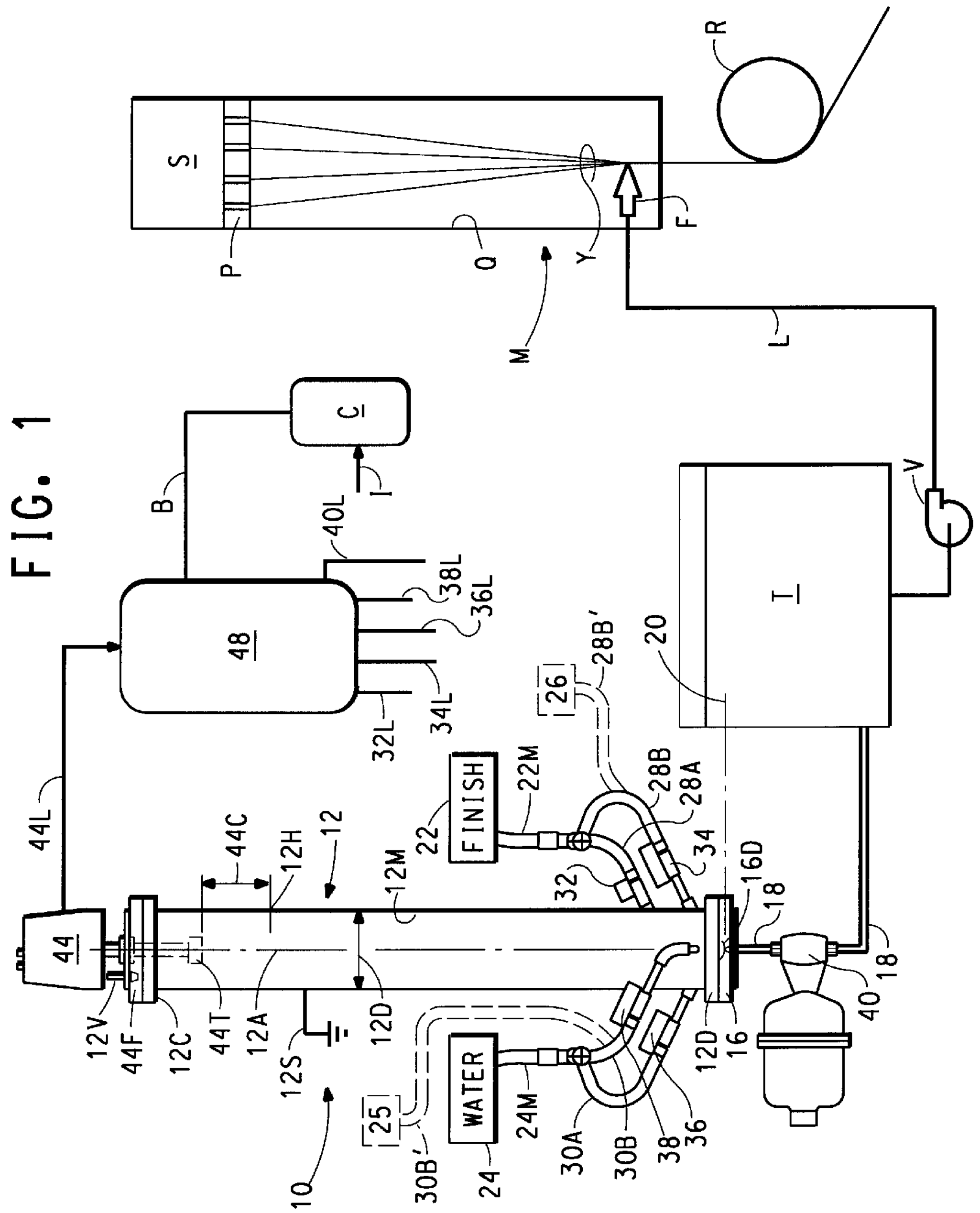
FIG. 1 is a side elevational of a precision volumetric measuring and mixing apparatus in accordance with the present invention. The Fig. also shows in highly stylized diagrammatic form a spinning machine for spinning a synthetic thermoplastic fiber and illustrates the cooperative association of the measuring and mixing apparatus with the spinning machine.

With reference to FIG. 1 shown in diagrammatic form is a thermoplastic synthetic fiber spinning machine M with which is associated a precision volumetric measuring and mixing apparatus (or "diluter") generally indicated by the reference character 10. As is well known the spinning machine M includes a spin pack S in which an apertured spinneret plate P is disposed. Molten thermoplastic polymer is extruded through the apertures in the spinneret plate P to form individual filaments of a synthetic thermoplastic yarn Y. The filaments of the yarn Y are gathered and pulled through a quench chimney Q by the action of one or more driven rolls R.

At some point along their path of travel the filaments of the yarn Y pass through a finish applicator diagrammatically indicated by the reference character F. Liquid finish material is pumped by a pump V from a finish holding tank T to the finish applicator F through a line L. The tank T is fabricated, in the usual instance, from corrosion resistant stainless steel, which is compatible with various sterilization and bacteria control measures. Suitable agitators, temperature controls, vents, mounting struts, piping and other typical appurtenances for mounting the tank T are omitted from FIG. 1 for clarity of illustration.

Overall operation of the spinning machine M is typically controlled by a dedicated controller C, such as the distributed process control system manufactured by Honeywell Inc., Minneapolis, Minn., and sold as the Honeywell TDC3000. Signals representative of various selectably controllable parameters of the spinning process may be input directly to the controller C, as diagrammatically indicated at reference character I.

The precision volumetric measuring and mixing apparatus (or "diluter") 10 includes a mixing tank 12 the interior of which defines a finish liquid mixing and measuring chamber 12M. The tank 12 has a base, or drain, end 12D and an upper, or cap, end 12C. The axis 12A of the tank 12 serves as a useful measuring reference along the height of the tank 12 from the level of the drain end 12D of the tank. Both ends are preferably flanged to facilitate occasional disassembly for maintenance or cleaning. In the preferred instance the tank 12 is configured in the form of a relatively narrow, elongated right circular cylinder. A vent opening 12V is located at any convenient position (as through the flange 44F) and allows air to pass freely into and out of the chamber 12M when the tank 12 is being filled or drained.

It should be understood that the tank 12 may be configured to exhibit any predetermined alternative configuration so long as a predetermined volumetric increment produces a corresponding linear increment along the axis of the tank. For example, the tank may be implemented as a cylinder having a constant cross sectional dimension along its axis and either a rectangular or a square shaped drain end 12D. Alternatively, the tank may have a cross section that varies along its axis, with either a circular drain end (e. g., a conical tank) or a square or rectangular drain end (i. e., a pyramidal tank). Other configurations for the tank can be easily envisioned. As will be developed, such a shape is preferred so that the introduction of a relatively small volumetric increment of liquid into the mixing chamber 12M is manifested by a relatively large linear movement of the surface of the liquid along the axis 12A of the tank 12. The tank 12 is fabricated from corrosion resistant material, such as 304 stainless steel for reasons similar to that discussed with respect to the tank T.

The drain end 12D of the tank 14 is closed by a flanged drain plate 16 having a drain opening 16D therein. The plate 16 is joined to a conduit 18 that connects the mixing tank 12 to the finish holding tank T. To effectuate a holding tank monitoring function to be described, the tank 12 is mounted, using any suitable strut or support arrangement diagrammatically indicated by the reference character 12S, such that the lowest end of the drain opening 16D is positioned at a predetermined position 20 with respect to the holding tank T. It should be noted that the conduit 18 must be connected to the tank T at a point above the bottom of the tank T and at a point lower than the position 20.

The mixing tank 12 of the precision volumetric mixing apparatus 10 is connected, via respective manifold lines 22M, 24M, to a source of concentrated finish liquid diagrammatically indicated by the reference character 22, and to a source of diluent liquid (e. g., deionized water) diagrammatically indicated by the reference character 24. The liquid sources 22, 24 may be implemented in any convenient fashion. In practice, a plural number of sources 22 of finish liquid, each with a corresponding manifold line 22M, may be provided, whereby relatively rapid changeover from one finish material to another may be effected.

In accordance with the present invention the mixing chamber 12M within the tank 12 is connected to the liquid supply manifold 22M from the first liquid source 22 through a first pair of liquid supply lines 28A, 28B. The mixing chamber 12M within the tank 12 is also connected to the liquid supply manifold 24M from the second liquid source 24 through a second pair of liquid supply lines 30A, 30B. In the preferred arrangement the lines 28A, 28B, 30A and 30B are attached equiangularly about the circumference of the mixing tank 12 near the drain end 12D thereof through small pipes which serve as entrance nozzles. Nozzle diameters are sized small enough to give a jetting effect for good mixing action as liquid is introduced into the mixing chamber 12M, but not so small as to significantly lengthen the time required for filling. The axes of the nozzles 28A, 28B, 30A and 30B at their connection to the tank 12 are inclined at a predetermined angle to the axis of the tank to further improve mixing agitation as well as to allow their contents to drain into the tank. The angle of inclination of a supply line to the axis of the tank is on the order of about thirty (30) to about sixty (60) degrees, and more preferably, about forty-five (45) degrees. Each individual supply line may incline at a respective different angle to the tank axis if desired.

A gross control valve 32, 36 is respectively connected in a flow control relationship within one of the liquid supply lines in each pair, while a fine control valve 34, 38 is respectively connected in a flow control relationship within the other of the liquid supply lines in each pair. For example, as illustrated, the gross control valve 32 is connected in the liquid supply line 28A while the fine control valve 34 is connected in the liquid supply line 28B. Similarly, the gross control valve 36 is connected in the liquid supply line 30A while the fine control valve 38 is connected in the liquid supply line 30B. The gross control valves 32 and 36 are preferably implemented using the solenoid actuated valve device having selected flow rating (orifice sizes) such as sold by the Skinner Valve Division of Honeywell Corporation of New Britain, Conn. as model 71215SN21V00N0C322P3. The fine control valves 34 and 38 are preferably implemented using the solenoid actuated valve device with smaller flow rating (orifice size) such as are also sold by Skinner Valve Division of Honeywell Corporation under model 71215SN2EF00N0C111P3.

A drain control valve 40 is connected within the outlet conduit 18 between the drain outlet 16D of the tank 12 and the holding tank T. Suitable for use as the drain control valve 40 is the electrically actuated device sold by Worchester Controls Company, Marlboro, Mass., as model S4466RTSE with actuator 10H755W115A. A larger diameter drain valve is chosen to facilitate rapid draining by gravity in order to maximize diluter throughput rate and enhance mixing in the tank T.

The apparatus 10 further includes a liquid level detector 44 for measuring on a continuous basis the volume of liquid present in the mixing chamber 12M. Signals representative of the volume of liquid within the chamber 12M, as manifested by the level along the axis 12A of the tank occupied by the liquid in the tank, are output from the detector 44 over the line 44L. Conveniently, the flanged base 44F of the detector 44 is mounted in the cap end 12C of the tank 12. The tank 12 is sized such that the transducer 44T of the detector 44 may lie a predetermined clearance distance 44C above the predetermined height level 12H of the working volume in the mixing chamber 12M.

Any continuous liquid level sensor with a resolution of about +/−0.1 inch resolution over a range from zero to about thirty-six (36) inches or greater could be used. The term "continuous" is to be construed to encompass a device that makes measurements on a relatively rapid intermittent basis during operation. Preferred for use as the liquid level detector 44 is the high discrimination, noncontacting ultrasonic detector apparatus sold by Drexelbrook Engineering Company, Horsham, Pa. under model 505-1110-002-00. This sensor has a capability of measuring liquid level within the resolution of +/−0.1 inch within a two second response time. The sensor has a selectable pulse repeat rate of about two (2) to seven (7) times a second. A noncontacting liquid level detector is preferred to minimize problems caused by fouling or biomass accumulation.

As noted earlier, the tank 12 is preferably configured in the form of a relatively narrow, elongated right circular cylinder having a length-to-diameter ratio of the mixing chamber such that the predetermined minimum volume change detectable by the detector 44 is less than five percent (5%), but more preferably, less than one percent (1%) of the predetermined working volume of the mixing chamber 12M.

The operation of the precision volumetric mixing apparatus 10 is controlled by a programmable controller, generally indicated by the reference character 48. The controller 48 is operatively interfaced over a line 44L to receive signals from the detector 44 representative of the volume of liquid within the mixing chamber 12M within the tank 12. In addition the controller 48 is operatively associated with the valves 32, 34, 36, 38 and 40 over respective control lines 32L, 34L, 36L, 38L and 40L. The controller 48 is also interfaced with the dedicated controller C of the spinning machine M over a bus B. Suitable for use as the controller 48 is the programmable logic controller sold by Allen-Bradley, a Rockwell Automation Company, Milwaukee, Wis., under model SLC 5/03.

-o-0-o-

Having described the structure of the precision volumetric mixing apparatus 10 its preferred mode of operation may now be discussed. It should be understood that the actuation of the various valves included within the diluter apparatus 10 is controlled by output signals on the respective lines from the programmable controller 48. The controller 48 is operated in accordance with any suitable form of program written in an convenient programming language whereby the various functional operations of the apparatus 10 to be described may be implemented.

The precision volumetric measuring and mixing apparatus 10 in accordance with the present invention serves to prepare and supply to the holding tank T liquid material having a desired output finish concentration therein. In the preferred implementation the diluter apparatus 10 is operable in any of three desired operating modes, viz., "Run" mode, "Stop on Empty" mode, or "Stop on Full" mode. Within any selected operating mode there are three distinct stages of operation, viz., drain stage, concentrated finish fill stage, and diluent fill stage.

To begin, at the controller C of the spinning machine M an operator inputs (via I) the desired mode of operation, as well as values representing the desired output finish concentration from the diluter 10 ("diluted finish percentage concentration") and the supply concentration percentage ("concentrated finish percentage"). Signals representative of the selected mode and values are applied over the bus B to the controller 48. Alternatively, the mode and values signals may be entered into the controller 48 via another computer, such as a laptop PC equipped with the proper software, such as Rockwell Software RSLogix500.

Using the input values the controller 48 determines four liquid level setpoints along the axis 12A for the filling of the tank 12. Although during operation the setpoints are reached sequentially from the lowest fill level to the highest fill level, it is believed easier to describe the setpoints in reverse order.

The fourth, or highest, liquid level setpoint (termed the "slow diluent fill setpoint") determines the size of the batch of diluted finish being made in one cycle of operation of the diluter 10. When this setpoint level along the axis 12A is reached the diluent filling stage is complete.

The third setpoint (termed the "fast diluent fill setpoint") is established at some predetermined percentage of the fourth setpoint. The third setpoint may be adjusted by changing the percentage of the fourth setpoint at which it is desirable to slow the diluent filling rate so as not "overshoot" the fourth setpoint. The percentage used is typically in the range from about eighty (80%) to about ninety-five (95%) percent, and more preferably approximately eighty-five (85%) percent, of the fourth setpoint.

The second liquid level setpoint (termed the "slow finish fill setpoint") determines the volume of supply concentrated finish admitted into the tank 12. This second setpoint is calculated by multiplying the "slow diluent fill setpoint" with the "diluted finish percentage concentration", and dividing the resulting product by the "concentrated finish percentage". When this second setpoint level along the axis 12A is reached the finish filling stage is complete.

The first setpoint (termed the "fast finish fill setpoint") is established at some predetermined percentage of the second setpoint. The first setpoint may be adjusted by changing the percentage of the second setpoint at which it is desirable to slow the finish filling rate so as not to "overshoot" the second setpoint. The percentage used is typically in the range from about eighty (80%) to about ninety-five (95%) percent, and more preferably approximately eighty-five (85%) percent, of the second setpoint.

The determination of the various setpoints should be made clearer by the following Example.

EXAMPLE

A four (4) gallon batch will be made in a mixing tank 12 having a mixing chamber 12M with a working volume having a 5.79 inch inside diameter 12D and a thirty-six (36) inch height 12H. The "slow diluent fill setpoint" is selected at 35.11 inches along the axis 12A from the level of the drain end of the tank 12. The "fast diluent fill setpoint" is determined to be (85%×35.11) inches, or 29.84 inches along the axis 12A from the drain end 12D. Assuming that a supply of twenty (20%) percent concentrated finish is to be fed to the diluter apparatus 10 from the source 22, and that it is desired to dilute this with a water diluent from the source 24 to supply to the holding tank T a liquid having a "diluted finish percentage concentration" of five (5%), the "slow finish fill setpoint" is determined to be (35.11 inches×5%)/20%, or 8.78 inches along the axis 12A. The "fast finish fill setpoint") is determined to be (85%×8.78) inches, or 7.46 inches along the axis 12A from the drain end 12D. For smaller batch sizes the "slow diluent fill setpoint" may be adjusted until the predetermined minimum detectable volume change cannot be met. At that time, the working volume of the mixing chamber 12M would be modified accordingly, as by reducing the tank diameter 12D.

Initially, the controller 48 determines whether the apparatus 10 is in the drain stage. If so, the drain valve 40 is opened (if not already open), by a signal from the controller 48 over its associated control line 40L, and the supply valves 32, 34, 36, and 38 are closed (if not already closed), by signal from the controller 48 over their respective lines 32L, 34L, 36L and 38L. The elapsed time required to complete draining is monitored.

When drain stage is complete (by virtue of the level of the liquid in the tank 12 reaching zero level) and after a predetermined time delay expires, whether further action proceeds to other stages depends upon the operating mode selected by the operator. If "Stop on Empty" mode is selected, the operation of the apparatus 10 would be terminated. The "Stop on Empty") mode would typically be used when converting the spinning machine to a new process setup or in preparing to shut it down. Stopping the diluter apparatus 10 ahead of time allows the contents of the tank T to be consumed rather than disposed of as waste.

However, if either "Run" mode or "Stop on Full" mode is selected, the apparatus 10 moves into the finish fill stage of operation. In the finish fill stage the controller 48, over the control line 40L, closes the drain valve 40. After allowing time for valve operation, the controller 48, asserts both the gross flow valve 32 and the fine flow valve 34 over the respective control lines 32L, 34L. As their names imply, these two valves are sized differently, and when both are simultaneously asserted concentrated finish liquid from the manifold 22M is rapidly admitted into the chamber 12M within the tank 12. As the concentrated finish liquid level rises within the tank, the level (i. e., distance the liquid rises along the axis 12A) is continuously monitored by the detector 44.

When the detected level in the tank 12 reaches the "fast finish fill setpoint, the controller 48 in response to the signal from the detector 44 closes the gross fill valve 32. Concentrated finish liquid is thereafter admitted into the tank 12 through only the fine flow valve 34. When the detected level in the tank 12 reaches the "slow finish fill setpoint" (again through the level detected by the detector 44) the controller 48 closes the fine fill valve 34.

The controller 48 next advances to the diluent fill stage. This stage proceeds analogously to the finish fill stage. The controller 48 asserts both the gross flow valve 36 and the fine flow valve 38 over their respective control lines 36L, 38L. These two valves are also sized differently, and when both are simultaneously asserted diluting liquid from the manifold 24M is rapidly admitted into the chamber 12M within the tank 12. As the liquid level of the mixture (of finish and diluent) rises within the tank the level is again continuously monitored by the detector 44. When the detected liquid level in the tank 12 reaches the predetermined "fast diluent fill setpoint" the controller 48, in response to the signal from the detector 44, closes the gross fill valve 36. Diluent thereafter flows into the tank 12 through only the fine flow valve 38. When the detected level in the tank 12 reaches the "slow diluent fill setpoint" (again through the level detected by the detector 44), the controller 48 closes the fine fill valve 38. Reaching the "slow diluent fill setpoint" indicates that a full batch has been measured into the chamber 12M on the interior of the tank 12. The above-described sequence of operation of the gross valve 32 and fine valve 34 during the finish fill permits more precise control of the filling of the tank 12 with the finish concentrate. The sequence of operation of the gross valve 36 and the fine valve 38 during the diluent fill stage is similarly seen to control more precisely the fill of the tank 12 with diluent. Since liquid level is continuously monitored by the detector 44, the two-valve flow control scheme for both finish and diluent uses of the full resolution capability of the detector to measure the volume of liquid within the tank 12 so that the various setpoints are not overshot or undershot, even when supply pressure transients or changes in liquid viscosities occur. Use of the gross valve-fine valve flow control scheme also imparts the ability to fill rapidly an appropriately sized tank (for a given batch) even with low and/or fluctuating supply pressures. This ability permits the use of inexpensive polymeric tubes or hoses for liquid supply.

If the "Stop on Full" mode is selected the operation of the diluter 10 stops at this point. Such a mode is used, for example, to prepare a finish sample, to check to normal operation, or to prepare for spinning machine start-up.

When the "Run" mode is selected, and when the "slow diluent fill setpoint" is reached the controller 48 asserts the drain valve 40 over the line 40L. The precisely measured volumes of concentrate finish and diluent flow into the tank T through the line 18.

As noted earlier, by positioning the tank 12 such that the lowest end of the drain opening 16D is positioned at the predetermined position 20 with respect to the holding tank T, the sensor 44 can also serve to monitor the level of liquid within the tank T. As described in connection with the drain stage, by monitoring the level in the tank T indirectly by monitoring the level in the tank 12, another batch will not be measured into the mixing chamber 12M prior to complete draining of liquid from the tank T. This prevents starting a new batch on top of a partially consumed previous batch. Such an abnormal situation could occur for various reasons, such as the failure to drain the tank T at the last spinning machine changeover. Both the hardware and the software of the diluter 10 is designed for failsafe operation, including hold-in-place during power outages or device failures. Operations would resume with proper mixing after power is restored and alarms are reset.

The controller 48 is also able to indicate anomalous conditions by the triggering of various alarms. Alarms may be triggered if: the indicated level in the tank 12 is not in accordance with the program (this could occur as a result of leaking valves, loss of supply or water flow, level sensor failure); if invalid values are entered by the operator (i. e., the numerical values exceed the processing capability of the controller); or if excessive elapsed time is required to fill or drain the tank 12. For example, dilute finish must be supplied to the tank T at a rate to meet the spinning demand. If fill time of the tank 12 is longer than a predetermined value, an alarm alerts the operator to begin trouble shooting the system before the spinning finish tank level drops too low to maintain operations.

One particularly useful alarm routine is practiced by the controller after the "slow diluent fill setpoint" has been reached indicating that a full batch has been measured into the tank 12. The controller, following the termination of the actuation sequence for the gross and fine control in the respective first and second supply lines, monitors the volume of liquid in the mixing chamber as measured by the detector for a predetermined time delay period (e.g., thirty seconds). The controller operates to generate an alarm signal if the measured volume of the liquid deviates from, either above or below, the predetermined reference liquid volume defined by the "slow diluent fill setpoint". Deviation above this reference could indicate that one or more of the valves 32, 34, 36 and/or 38 is leaking. Deviation below this reference could indicate that the drain valve 40 is leaking.

Those skilled in the art, having the benefit of the teachings of the present invention, may impart numerous modifications thereto. For example, it lies within the contemplation that the apparatus 10 may be adapted to control the precision mixing of more than two liquid materials. For example, the admission into the tank 12 of three or four separate liquids may be controlled.

As one alternative embodiment additional liquid supply lines and additional input nozzles equipped with gross and fine control valves could be installed in the mixing tank 12 and the controller 48 programmed to manage the additional liquid inputs.

Alternatively, more supply lines and flow control valves can be joined onto the existing input nozzles. For example, a third liquid, such as a supply of coloring tint pre-mixed with diluent liquid, could be added by substituting it in the place of the diluent fluid as a feed to the slow diluent control valve 38. This alternative is illustrated in dashed lines in FIG. 1. The third source of liquid is indicated by the reference character 25 and is connected through a separate supply 30B' to the fine control valve 38. The amount of this third liquid to be added would be determined by choosing an appropriate value for level setpoint number three, viz., choosing an appropriate percentage of setpoint number four. If more colorant in the final mix is desired the percentage value would be set lower, and vice versa. For maximum precision, the controller would operate sequentially the gross diluent fill valve 36 and the fine diluent fill valve. That is, the fine diluent fill valve 38 (controlling colorant liquid) is opened only when the gross diluent fill valve 36 is closed (with no simultaneous operation of each, as described earlier).

As yet another embodiment, four liquids could be measured and mixed. This alternative is also illustrated in dashed lines in FIG. 1. The fourth source of liquid is indicated by the reference character 26 and is connected through a separate supply line 28B' to the fine control valve 34. In this alternative embodiment only fine control valves would be used (i. e., the gross valves 32 and 36 are replaced by fine valves similar to valves 34 and 38). The controller is changed so that only one valve at a time is operated, feeding a separate liquid supply to each nozzle and calculating setoints one, two and three as specified percentages of setpoint number four.

It is also to be noted that throughout this application the discussion has described the measuring and mixing of spin finish. It should be apparent that the diluter can also find utility with other liquid, such as the formulation of beverages, fuel, drugs, food and paints. Although gravity feed as been described as the mechanism for emptying the tank 12 (thus avoiding the requirement for a pump for the tank 12) if the diluter 10 is used with other, more viscous, materials, it may be necessary to provide some mechanism to assist in emptying the tank 12. This could be accomplished through the use of a pump for the tank 12, or by supplying compressed gas to the vent opening at the appropriate time (when the drain valve is open and there is a liquid level greater than zero in the tank) to blow down viscous materials.

It is to be understood that the foregoing and other modifications are to be construed as lying within the contemplation of the present invention, as defined by the appended claims.

What is claimed is:

1. An apparatus for measuring and mixing a first liquid with at least a second liquid, comprising:

a tank having a mixing chamber therein;

a first and a second supply line for connecting the mixing chamber to a first source of liquid;

a first and a second supply line for connecting the mixing chamber to a second source of liquid;

a gross control valve disposed in each of the first supply lines and a fine control valve disposed in each of the second supply lines;

a liquid level detector for measuring the total volume of liquid present in the mixing chamber; and a controller, operable in response to signals output from the detector representative of the total volume within the mixing chamber as continuously measured by the detector, for actuating in accordance with a predetermined sequence the gross and the fine control valves in the respective first and second supply lines from the first source and the gross and fine control valves in the respective first and second supply lines from the second source.

2. The apparatus of claim 1 wherein the liquid level detector is a noncontacting ultrasonic liquid level detector.

3. The apparatus of claim 1 wherein one of the liquids is a concentrated spin finish liquid material and the other of the liquids is a diluent.

4. The apparatus of claim 1 further comprising an outlet conduit connected to the mixing chamber, the outlet conduit having a drain valve therein, the controller actuating the drain valve in the outlet conduit when the volume of liquid in the mixing chamber as measured by the detector equals a predetermined liquid volume.

5. The apparatus of claim 4 wherein the outlet conduit is connected to a holding tank, and wherein the tank is positioned with respect to the holding tank so that the level of liquid in the mixing tank represents the level of liquid within the holding tank.

6. The apparatus of claim 1 wherein the controller, following the termination of the actuation sequence for the gross and fine control valves in the respective first and second supply lines, is operative to monitor for a predetermined time delay period the volume of liquid in the mixing chamber as measured by the detector and to generate an alarm signal if the measured volume of the liquid deviates from a predetermined reference liquid volume.

7. The apparatus of claim 1 wherein the liquid level detector is operative to sense a predetermined minimum change in liquid volume, and wherein the tank is a right circular cylinder, the mixing chamber within the tank having a predetermined working volume therein, wherein the length-to-diameter ratio of the mixing chamber is such that the predetermined minimum change detectable by the detector is less than one percent (1%) of the predetermined working volume of the mixing chamber.

8. An apparatus for measuring and mixing a first liquid with a second liquid and a third liquid, comprising:

a tank having a mixing chamber therein;

a first and a second supply line for connecting the mixing chamber to a first source of liquid;

a gross control valve disposed in the first supply line connected to the first source and a fine control valve disposed in the second supply line connected to the first source;

a supply line for connecting the mixing chamber to a second source of liquid;

a gross control valve disposed in the supply line connected to the second source;

a supply line for connecting the mixing chamber to a third source of liquid;

a fine control valve disposed in the supply line connected to the third source;

a liquid level detector for measuring the total volume of liquid present in the mixing chamber; and a controller, operable in response to signals output from the detector representative of the total volume within the mixing chamber as continuously measured by the detector, for actuating in accordance with a predetermined sequence the gross and the fine control valves in their respective supply lines from the first source, the second source and the third source.

9. An apparatus for measuring and mixing a first liquid with a second liquid, a third liquid, and a fourth liquid, comprising:

a tank having a mixing chamber therein, the tank being a right circular cylinder, the mixing chamber having a predetermined working volume therein;

a first supply line for connecting the mixing chamber to a first, second, third and fourth source of liquid;

a control valve disposed in the supply line connected to each source;

a liquid level detector for measuring the total volume of liquid present in the mixing chamber, the liquid level detector being operative to sense a predetermined minimum change in liquid volume; and, a controller, operable in response to signals output from the detector representative of the total volume within the mixing chamber as continuously measured by the detector, for actuating in accordance with a predetermined sequence the control valves in their respective supply lines from the first source, the second source, the third source and the fourth source, wherein the length-to-diameter ratio of the mixing chamber is such that the predetermined minimum change detectable by the detector is less than one percent (1%) of the predetermined working volume of the mixing chamber.

* * * * *